United States Patent
Menne et al.

(12)

(10) Patent No.: US 6,237,875 B1
(45) Date of Patent: May 29, 2001

(54) AIRBAG PAYLOAD LANDING SYSTEM FOR DAMPING LANDING IMPACT FORCES ON A FLYING PAYLOAD

(75) Inventors: Stefan Menne, Kolbermoor; Peter Nikolaus Keerl, Oberpframmern, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/376,746

(22) Filed: Aug. 17, 1999

(30) Foreign Application Priority Data

Aug. 18, 1998 (DE) ................................................ 198 37 329

(51) Int. Cl.⁷ ...................................................... B64D 1/14
(52) U.S. Cl. .................................. 244/138 R; 244/100 A
(58) Field of Search ................................ 244/138 R, 139, 244/140, 141, 100 A, 107; 180/124, 127

(56) References Cited

U.S. PATENT DOCUMENTS 2,700,518 * 1/1955 Ryno et al. ...................... 244/138 R
5,259,574 * 11/1993 Carrot ................................. 244/139

FOREIGN PATENT DOCUMENTS

| 535577 | * | 1/1957 | (CA) | ................................ | 244/138 R |
| 3247694 | * | 6/1984 | (DE) | ................................ | 244/138 R |
| 2664233 | | 1/1992 | (FR) . | | |
| 572152 | * | 9/1945 | (GB) | ................................ | 244/138 R |
| 604938 | | 7/1948 | (GB) . | | |
| 842370 | * | 7/1960 | (GB) | ................................ | 244/138 R |

\* cited by examiner

*Primary Examiner*—Galen L. Barefoot
(74) *Attorney, Agent, or Firm*—W. F. Fasse; W. G. Fasse

(57) ABSTRACT

An airbag configuration for braking the landing impact of flying payloads has a central airbag (17) and at least one torus ring (11, 12, 13) surrounding the central airbag. A payload (L) is attachable on the central airbag (17). A stabilizing device (19) is provided which extends from the lowermost portion of the at least one torus ring (11, 12, 13) to the central airbag (17). The central airbag provides primarily vertical braking of the landing impact while the torus ring provides primarily horizontal braking of the landing impact.

18 Claims, 8 Drawing Sheets

US 6,237,875 B1

AIRBAG PAYLOAD LANDING SYSTEM FOR DAMPING LANDING IMPACT FORCES ON A FLYING PAYLOAD

PRIORITY CLAIM

This application is based on and claims the priority under 35 U.S.C. §119 of German Patent Application 198 37 329.5, filed on Aug. 18, 1998, the entire disclosure of which is incorporated herein by reference.

FIELD OF THE INVENTION

The invention relates to an airbag payload landing system for braking or damping vertical and horizontal impact force components caused by a landing impact when a flying payload hits a landing surface.

BACKGROUND INFORMATION

Conventional airbags of this type have the disadvantage that they do not sufficiently stabilize the cross inclination of the payload when horizontal braking takes place. Further, conventional airbags have a relatively large volume so that their configuration adversely influences their handling. British Patent Publication 604,938 discloses a parachute landing gear for payloads to be dropped from an aircraft. The payload is mounted in a frame equipped with outrigger arms each carrying at its free end a foot for contacting the landing surface. A crash pan is mounted under the frame that carries the load. The crash pan is supposed to absorb most of the landing impact energy.

French Patent Publication 2,664,233 discloses an inflatable airbag for helicopters. The bag is normally stored as a deflated package between the landing skis or under the landing skis and laterally of the helicopter body.

The prior art leaves room for improvement especially with regard to avoiding damage to drop loads.

OBJECTS OF THE INVENTION

In view of the above it is the aim of the invention to achieve the following objects singly or in combination:

- to provide an airbag for braking or damping the landing impact of flying payloads which keeps the cross inclination of the payload during the braking action small;
- to combine several differently shaped airbag configurations to form a nest in which the payload is protected;
- to optimally reduce the weight and space requirements of such airbags; and
- to conform the size of the airbag combination to the size of the load.

SUMMARY OF THE INVENTION

According to the invention there is provided an airbag system for damping impact forces of a payload when the payload contacts a landing surface, said airbag system comprising an inflatable airbag central section for carrying said payload, at least one inflatable airbag ring section surrounding said airbag central section, and a stabilizing device interconnecting said airbag central section and said at least one airbag ring section.

The embodiment of the airbag according to the invention has a simple construction without separation walls or intermediate walls in order to minimize the packing volume and the packing weight of the airbag. Further, the load will retain a substantially upright position during a landing and will in most instances not contact the landing surface. Another advantage is seen in that a more precise dropping of a load into a well defined target area is now possible, even where the load and the airbag are dropped by parachute.

BRIEF DESCRIPTION OF THE DRAWINGS

In order that the invention may be clearly understood it will now be described in connection with example embodiments, with reference to the accompanying drawings, wherein.

Figure 1:
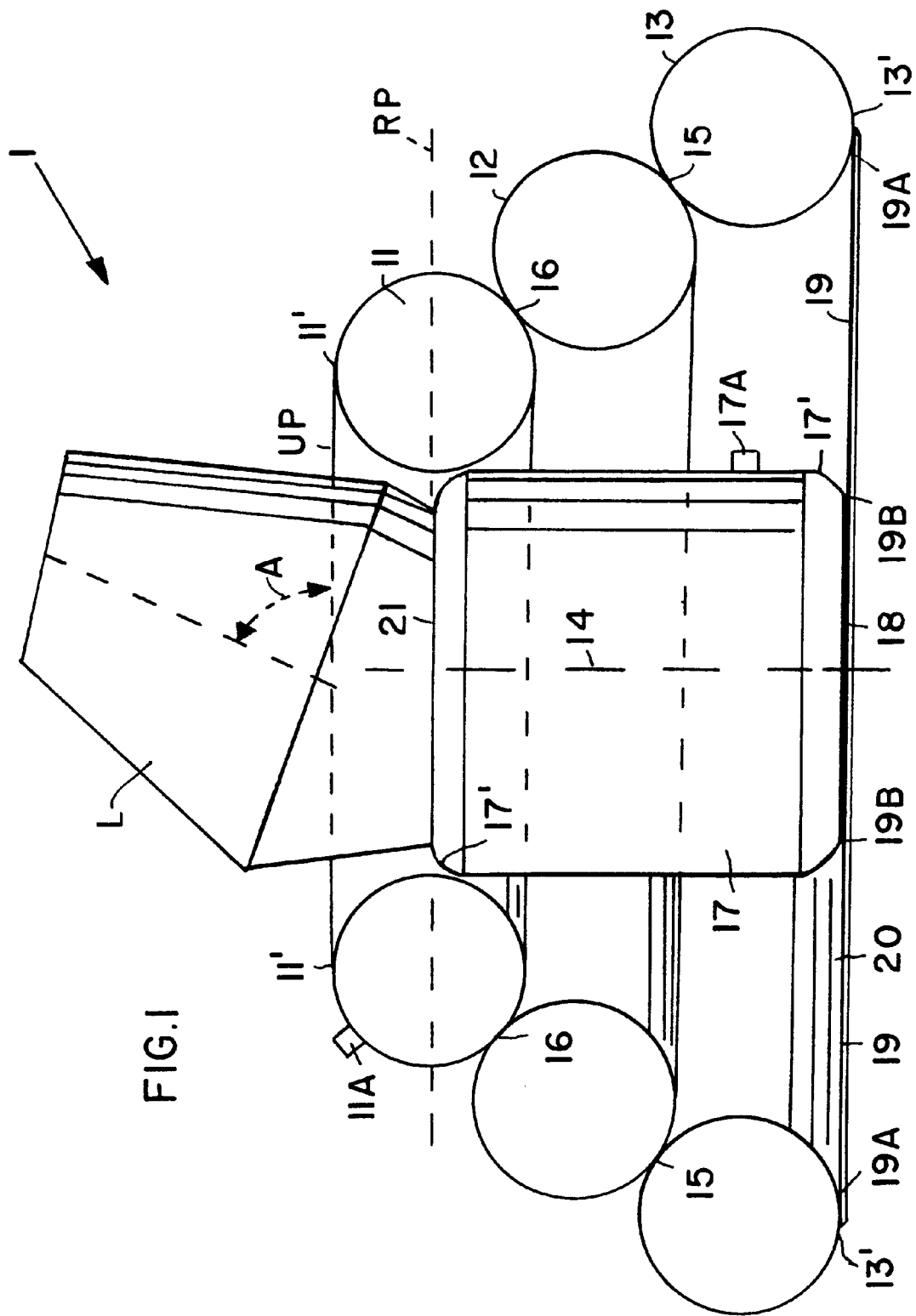
FIG. 1 is a side view partially in section of the present airbag system fully inflated and carrying a load.

DETAILED DESCRIPTION OF PREFERRED EXAMPLE EMBODIMENTS AND OF THE BEST MODE OF THE INVENTION

The airbag system 1 according to the invention comprises, for example, three airbag ring sections 11, 12, 13 stacked concentrically one above the other. The ring sections have ring diameters that diminish continuously from the bottom ring section 13 to the top ring section 11 along a central axis 14 corresponding to the Z-axis of a three-dimensional coordinate system 30. The ring section 13 of largest diameter is connected at 15 with the next smaller intermediate ring section 12. The intermediate ring section 12 is connected at 16 with the smallest diameter ring section 11. An airbag central section 17 is arranged concentrically to and inside the stack of ring sections 11, 12 and 13. This airbag central section 17 preferably has a substantially cylindrical configuration with a circular bottom surface 18 positioned in a plane tangent to the lowest ring line 13' of the lowest ring section 13. The cylindrical central section 17 has an upper preferably circular surface 21 positioned, as viewed in the direction of the central axis 14, in the area of a radial plane RP of the uppermost ring section 11. Stated differently, the upper surface 21 of section 17 lies below a plane UP tangent to the upwardly facing ring line 11' of the uppermost ring section 11. This construction forms a nest, so to speak, in which the load L is secured to the top surface 21 which forms the nest bottom. The corners 17' of the central section 17 are preferably rounded.

Figure 4:
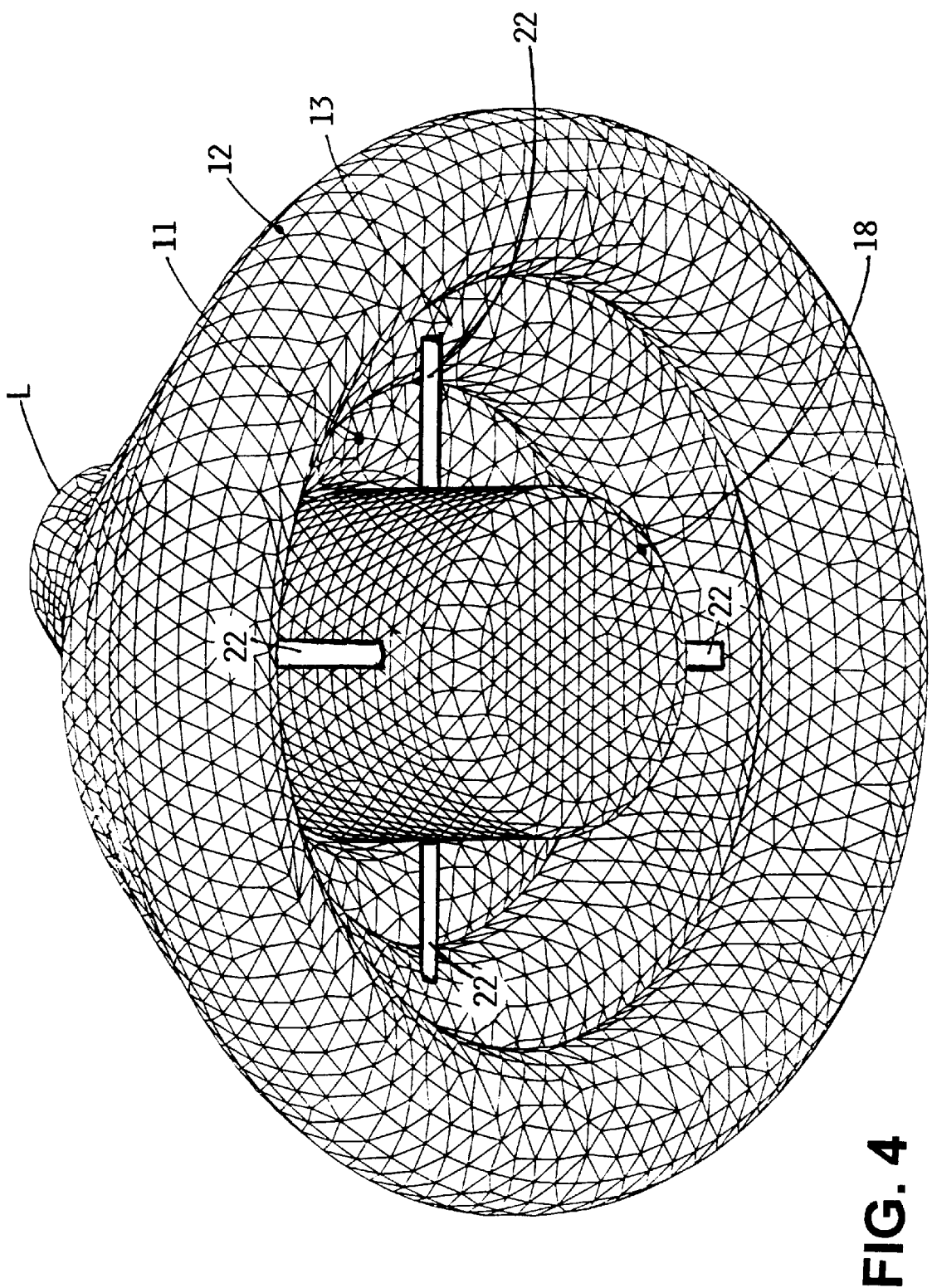
FIG. 4 is a view similar to FIG. 3, but illustrating bracing members between an airbag central section and an airbag ring section.

According to the invention a stabilizing device 19 is arranged between the airbag central section 17, particularly between the bottom surface 18 of the central section 17 and the downwardly facing surface portion or ring line 13' of the lowermost ring section 13. The stabilizing device 19 has, for example, the form of a tarpaulin which is secured in a horizontal lowermost tangent plane of the ring section 13 by connections 19A to the lowermost ring section 13 so that the space enclosed by the stack of ring sections 11, 12 and 13 is closed downwardly by the stabilizing device 19. The stabilizing device 19 may comprise additionally or alternatively other connections between at least one ring section 11, 12 or 13 and the central section 17. Such other connections are shown for example in the form of straps 22 in FIG. 4. Connections 19B secure surface 18 to the device 19.

Figure 2:
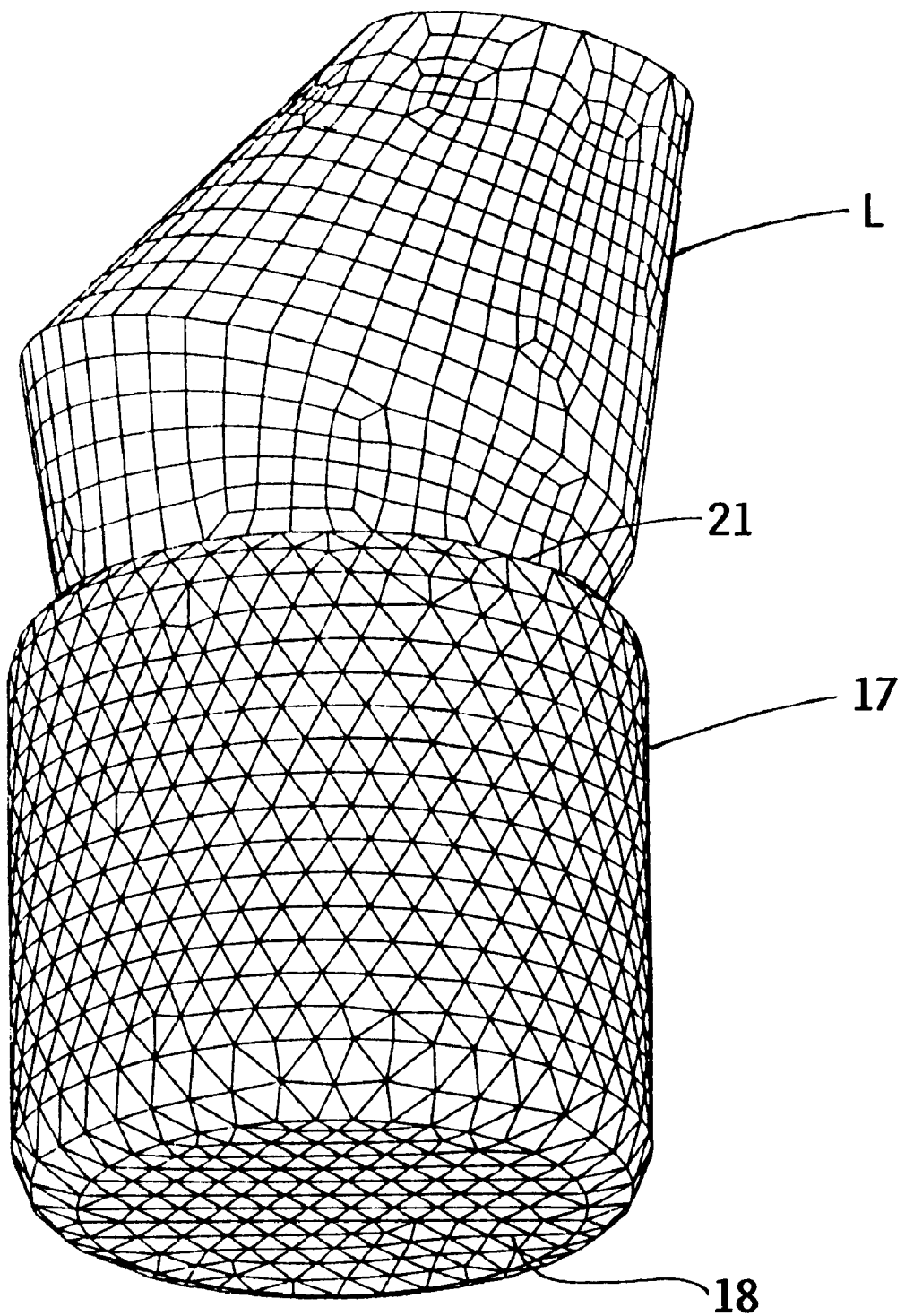
FIG. 2 shows a perspective view of the load secured to an airbag central section omitting the airbag ring section.

A payload L, for example in the form of a capsule, is secured on or to the upper circular surface 21 of the airbag central section 17 as shown in FIG. 2. The airbag central section 17 is primarily effective for generating a vertical braking action. For this purpose the airbag central section 17 is deflatable, for example, by a first device such as a valve or a port 17A that bursts or ruptures open preferably in a controlled manner when the airbag system impacts on a landing surface. Similarly, at least the top air bag ring section 11 is separately equipped with such a second deflating valve or port 11A that will gradually release at least some of the pressure in the respective ring section.

The airbag ring sections 11, 12 and 13 provide for a lateral or horizontal stability by applying a horizontal braking action component to the landing impact, whereby the cross inclination of the payload L is limited during horizontal braking action. The configuration of airbags according to the invention makes it possible that the horizontal landing speed component may be somewhat larger than the vertical landing speed component.

One ring section or several ring sections 11, 12, and 13 may be used to form a stack configuration of the airbag rings. At least the uppermost ring section 11 should be deflatable in a controlled manner for an efficient participation in the formation of the damping characteristic of the system.

Figure 3:
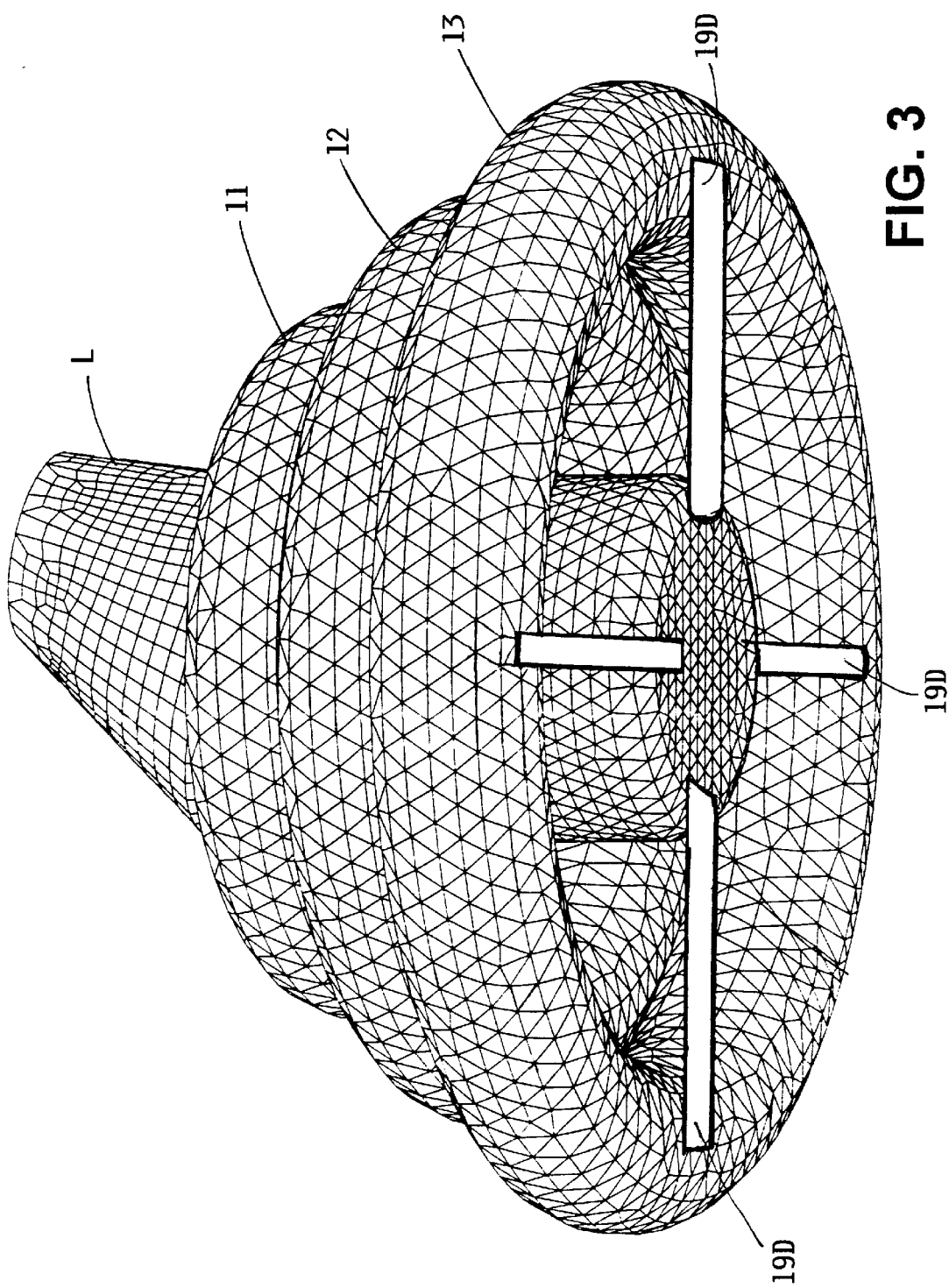
FIG. 3 is a perspective view into the bottom of the present airbag system wherein belts form a stabilizing device.
Figure 5:
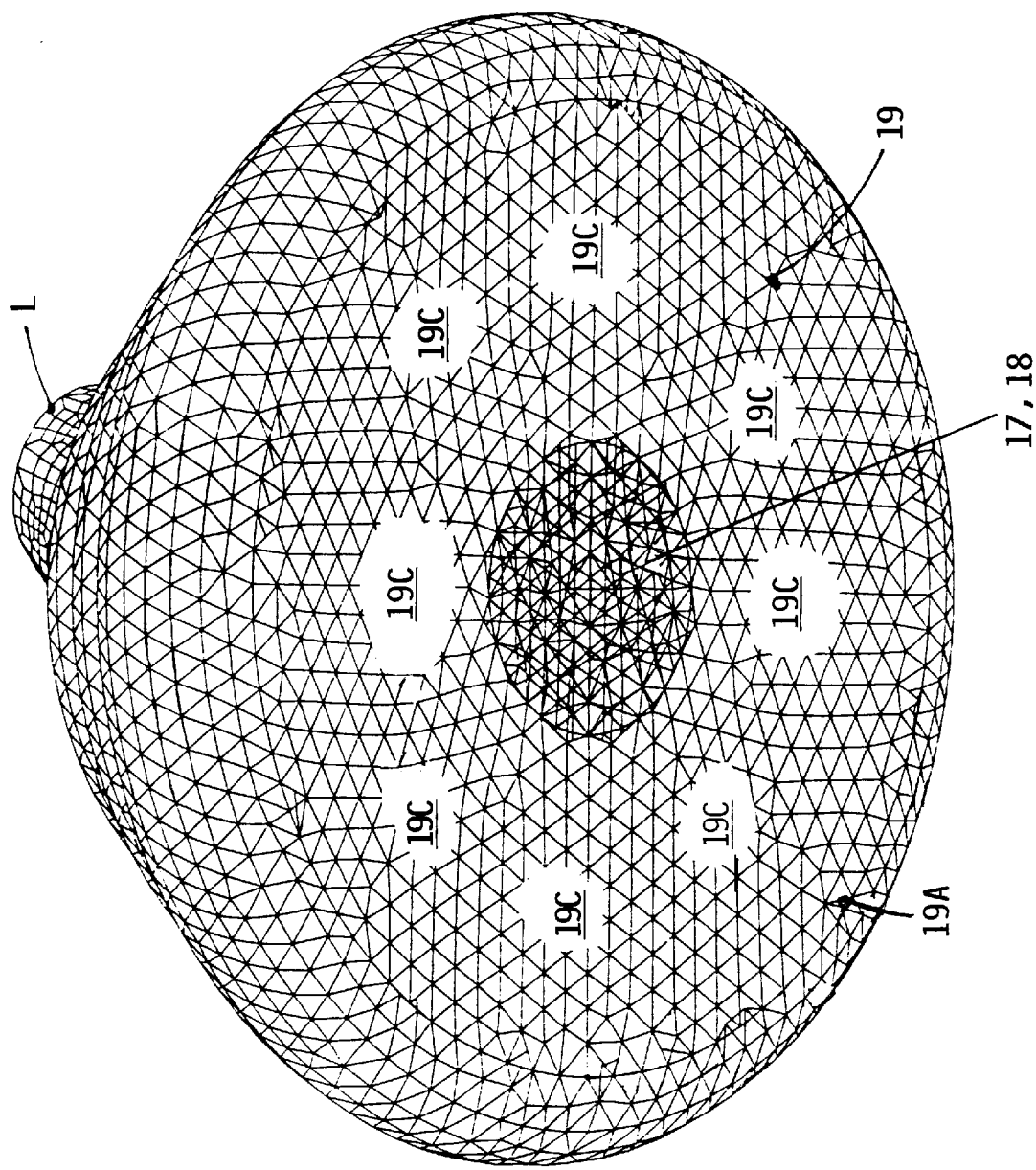
FIG. 5 is a perspective view against the bottom of the airbag system closed by a stabilizing device that has openings therein.

The above mentioned connections 19A between tarpaulin 19 and the central airbag section 17 and the downwardly facing side of the ring section 13 are formed as adhesive bonding connections, or stitched connections, or any other connections suitable for the present purpose of stably centering the section 17 in the stack 11, 12, 13. The tarpaulin 19 connects the airbag central section 17 and the lowermost ring section 13 so that an uninterrupted body comprising the airbag central section 17, the tarpaulin 19 and the ring sections 11, 12 and 13 is formed. The tarpaulin 19 may extend over the entire tangential surface touching the downwardly facing ring line 13' of the lowermost ring section 13 to which the tarpaulin 19 is attached at 19A thereby also covering the bottom 18 of the central section 17 to which the tarpaulin 19 is secured at 19B. Thus, the bottom surface 18 of the central section 17 does not come in direct contact with the landing ground or surface. The tarpaulin 19 may be coated with a lining or coating 20 that may be a friction reducing lining such as Teflon (RTM) in order to reduce the friction coefficient between the tarpaulin 19 and the landing surface. For certain purposes it may be desirable to increase the friction coefficient of the lining or coating 20, for example by a rubberized coating. In order to save weight, the tarpaulin 19 may have openings 19C as shown in FIG. 5 or the tarpaulin 19 may be replaced by a belt system or belt configuration 19D as shown in FIG. 3. The belt system 19D performs the same stabilization functions according to the invention as the tarpaulin 19. The tarpaulin 19, the belt system 19D, and the braces 22 shown in FIG. 4 may be made of any material suitable for the present purposes.

The payload L is connected to the top surface 21 of the airbag central section 17 and is not directly connected with the ring 11, 12 or 13. This feature enables the payload to immerse into the space surrounded by the rings 11, 12 and 13 during the landing procedure as will be explained in more detail below with reference to FIGS. 6 to 10.

Figure 6:
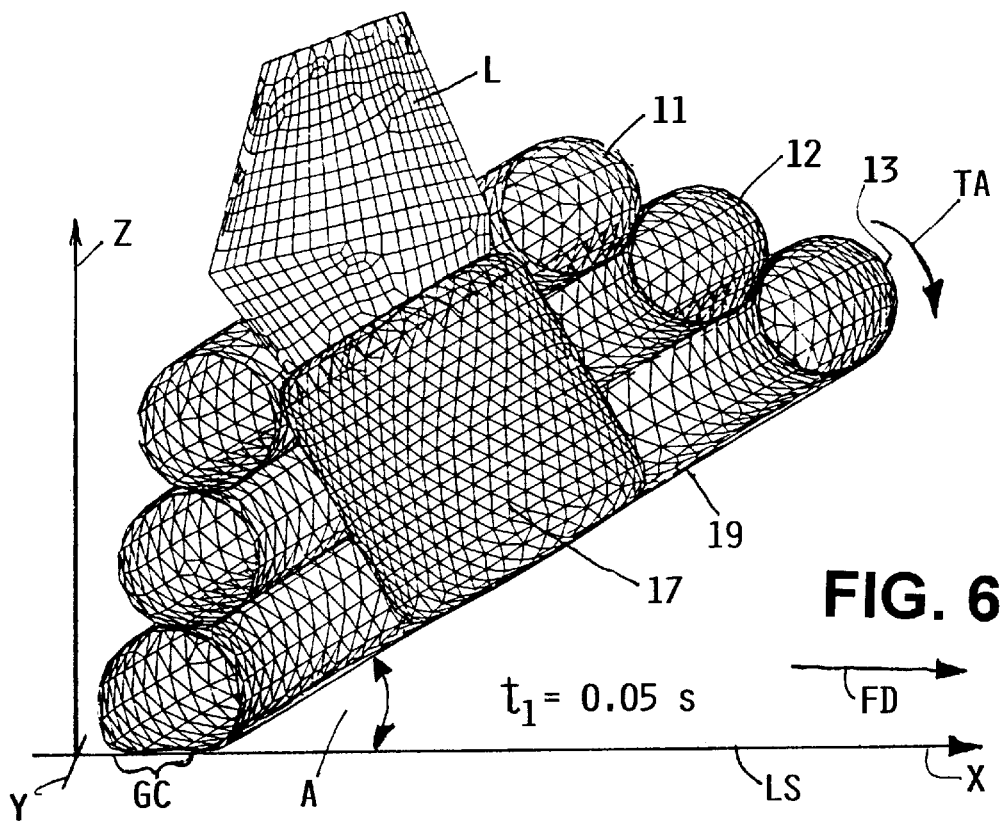
FIGS. 6 to 10 illustrate a sequence of airbag deformations caused by the landing impact while keeping the load in a relatively stable upright position under all landing conditions.
Figure 7:
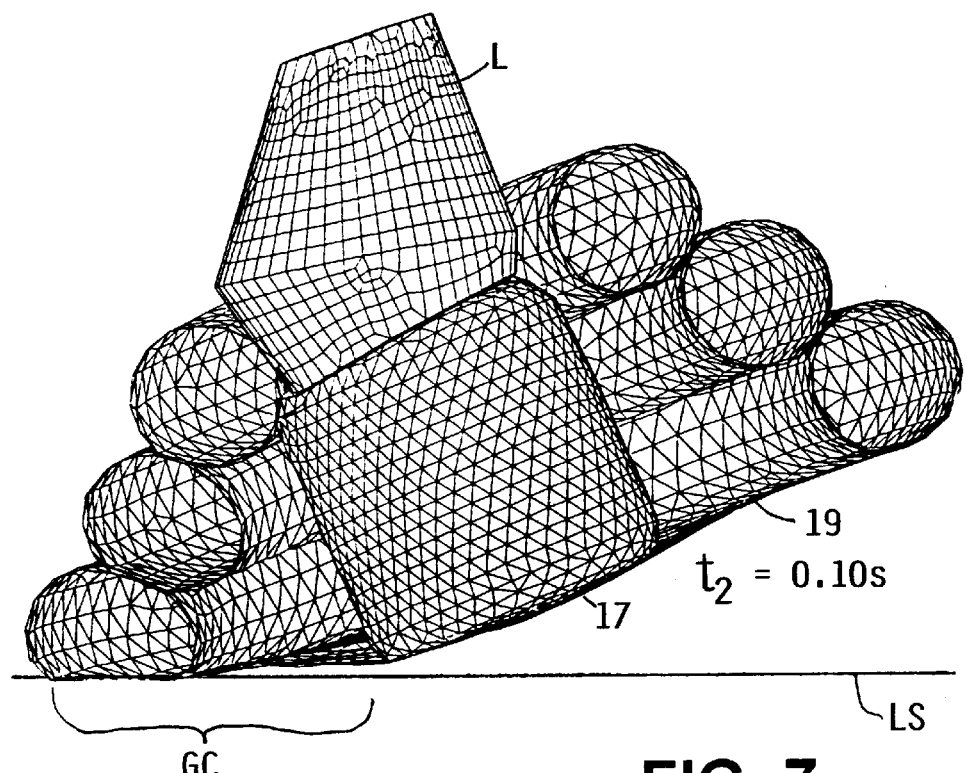

On principle, positive angles A of attack are to be preferred for the landing as shown in FIG. 6. Such angles A result according to the illustration in FIG. 6 if, starting with a flight direction FD in the positive X-direction on a landing surface LS, the underside of the airbag configuration is slanted in the positive Z-direction of a three-dimensional coordinate system. The slanting may be controlled by adjusting the length of the suspension ropes that secure the airbag system to a parachute not shown. Such adjustment will make the ropes on one side of the airbag system shorter than on the opposite side. By this positive angle A of attack a tilting motion of the payload L in the direction of a tilting arrow TA is induced prior to a time when the full friction force becomes effective when the airbag central section 17 contacts the landing surface LS. Such contact begins in FIG. 7. This frictional force generates a moment in the opposite direction, whereby a tilting motion started by the ground contact in a direction opposite to the arrow TA is primarily damped by the uppermost ring section 11 which therefore is preferably deflatable as described above by a valve or rupture point 11A, please also see FIG. 8.

The lower ring sections 12 and 13 serve for stabilizing of the ring shape of the airbag and for maximizing the ground contact surface during landing while minimizing the probability of a tip-over of the load. Furthermore, any spring forces caused by the payload L can be primarily introduced into the central section 17 and also into the uppermost ring section 11 and distributed therein, please see FIGS. 8, 9 and 10.

Ideally, the outer ring sections 11, 12 and 13 lead to a complete decoupling of the braking forces in the horizontal and vertical directions. The ring sections 11, 12 and 13 thus take over primarily the horizontal braking action while the airbag central section 17 takes over the vertical braking action. Analysis has shown that this is approximately the case for positive landing angles A of attack.

Referring further to FIGS. 6 to 10 in conjunction, these figures illustrate a simulated landing progression in 0.05 second intervals following a ground contact GC. FIG. 6 shows a time slot t=0.05 seconds after ground contact. The positive angle A of attack assures that first only the left side of the lowermost ring section 13 contacts the ground at GC. At a point of time $t_2$=0.10 seconds, the ground contact area GC has become larger and the lowermost ring section is further deformed at the left side thereof, please see FIG. 7.

Figure 8:
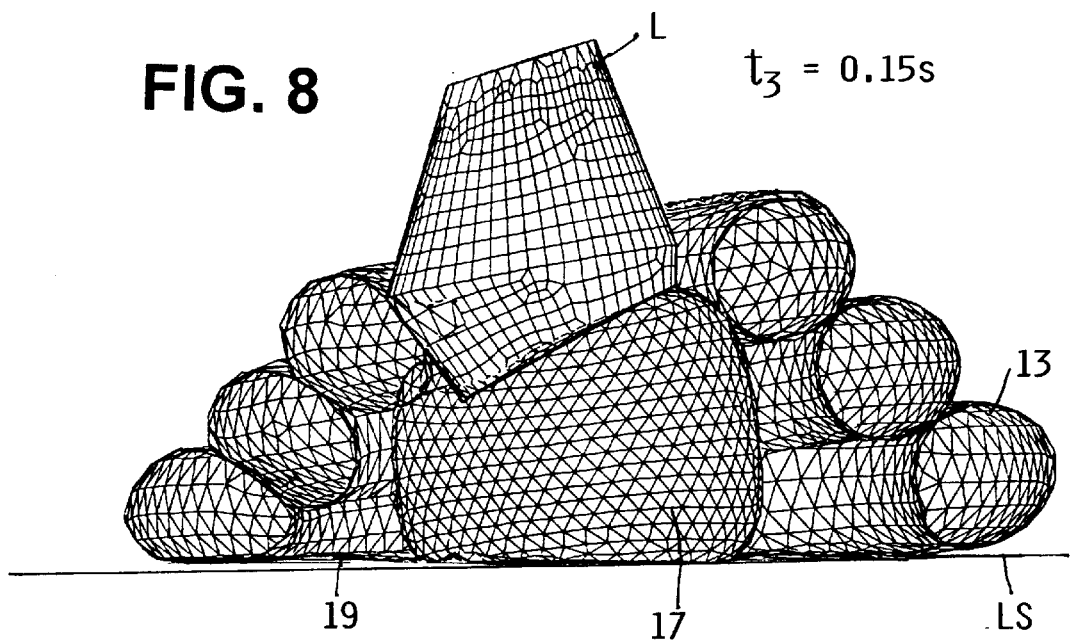
Figure 9:
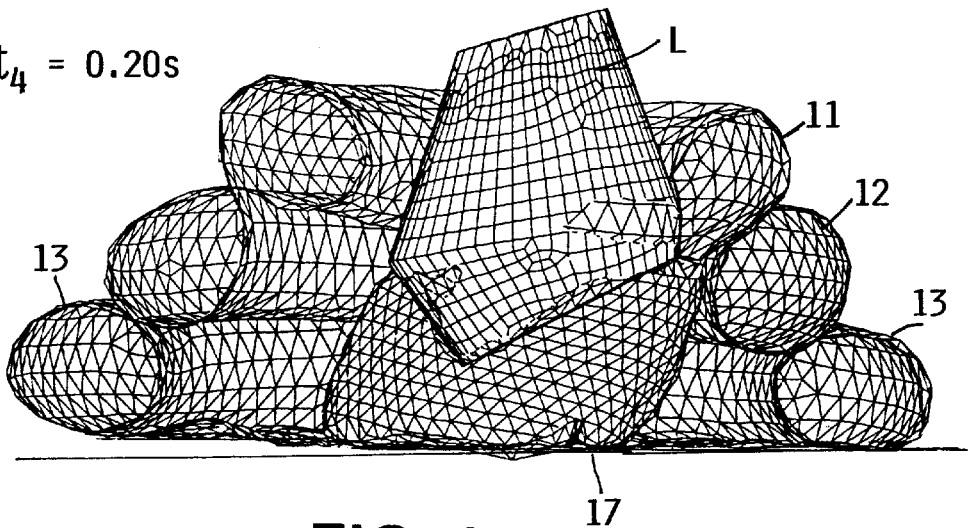

In FIG. 8 at a point of time $t_3$=0.15 seconds following ground contact, substantially the entire surface area of the stabilzing device 19 and substantially most of the downwardly facing surface area of the lower ring section 13 are contacting the ground or landing surface LS except the right-hand side of the ring section 13. In FIG. 9 at a point of time $t_4$=0.20 seconds, the left-hand end of the lowermost ring section 13 begins to lift off the ground and the central section 17 with the load L bear against the inner surfaces of the right-hand side of the ring sections 11 and 12 but not 13.

Figure 10:
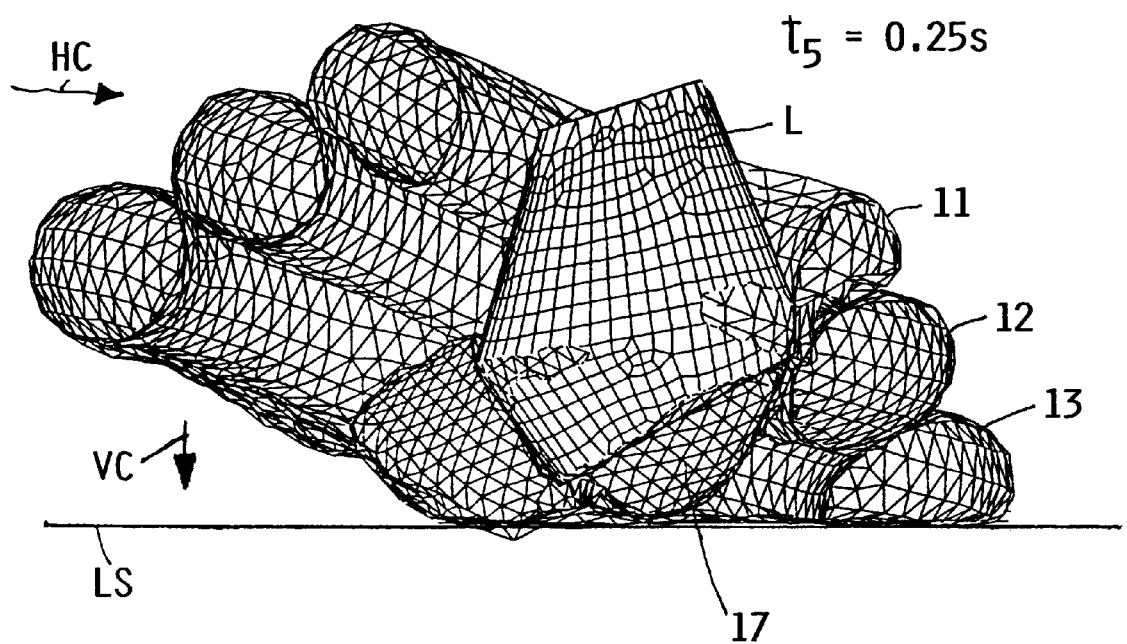

In FIG. 10 at a point of $t_5$=0.25 seconds following ground contact, the central section 17 is substantially deformed by vertical impact force components VC while horizontal impact force components HC are taken up by the ring sections primarily 11 and 12. It is advantageous that the central section 17 can deflate in a controlled manner as described above to absorb the vertical impact components VC.

The foregoing sequence has been simulated with an angle of attack A of +30° and under the assumption of worst case landing velocities as well as a worst case center of gravity location. Yet, FIGS. 6 to 10 show that the landing is remarkably stable since the load L substantially retains a vertical orientation for all landing times. The load L does not contact the lower ring 13. This is due to the stabilization devices according to the invention.

Although the ring sections have been shown to have a torus configuration with a circular ring cross-section, other ring cross-sections may be employed as required, for example square, rectangular, oval, or elliptical cross-sections may be employed.

Further, the individual sections 11, 12, 13, 17 may be enclosed in netting or the entire system may be enclosed in a netting.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An airbag payload landing system for damping impact forces on a payload (L) when the landing system contacts a landing surface (LS), said landing system (1) comprising a payload, an inflatable airbag central section (17) having an upper surface (21) carrying said payload (L), at least one inflatable airbag ring section (13) surrounding said airbag central section (17), and a stabilizing device (19) interconnecting said airbag central section (17) and said at least one airbag ring section (13), said airbag central section (17) comprising a first deflating member (17A) for deflating said airbag central section (17) in response to an impact whereby said airbag central section generates a vertical braking action, and wherein said at least one airbag ring section (13) comprises a second deflating member (11A) for releasing pressure from said at least one ring section (13) independently of any pressure release from said airbag central section (17) whereby said at least one ring section generates a horizontal braking action.

2. The airbag payload landing system of claim 1, wherein said upper surface (21) of said airbag central section is positioned below an upwardly facing plane (UP) defined by an upwardly facing ring line (11') of said at least one airbag ring section.

3. The airbag payload landing system of claim 1, wherein said stabilizing device (19) is a tarpaulin.

4. The airbag payload landing system of claim 1, wherein said stabilizing device is a netting secured to said airbag central section (17) and to said at least one ring section (13).

5. The airbag payload landing system of claim 1, wherein said stabilizing device (19) is a belt system (19D) interconnecting said airbag central section (17) and said at least one airbag ring section (13).

6. The airbag payload landing system of claim 1, wherein said stabilizing device is made of a flat material with openings (19C) therein.

7. The airbag payload landing system of claim 1, wherein said airbag central section (17) has a bottom surface (18) and wherein said at least one airbag ring section has a downwardly facing ring line (13') or surface portion extending in a plane defined by said bottom surface (18).

8. The airbag payload landing system of claim 7, wherein said stabilizing device (19) is connected to said bottom surface (18) and to said downwardly facing ring line (13') or surface portion of said at least one airbag ring section (13).

9. The airbag payload landing system of claim 1, further comprising bracing members (22) interconnecting said airbag central section (17) with said at least one airbag ring section.

10. The airbag payload landing system of claim 1, comprising a plurality of inflatable airbag ring sections (11, 12, 13) forming a stack around said central airbag section (17), said stack including at least a bottom ring section (13) and a top ring section (11).

11. The airbag payload landing system of claim 10, wherein each ring section of said plurality of inflatable airbag ring sections has a different ring diameter, and wherein a ring section with the largest ring diameter forms said bottom ring section of said stack and a ring section with the smallest ring diameter forms said top ring section of said stack.

12. The airbag payload landing system of claim 10 wherein said airbag central section (17) is positioned centrally in said stack has an upper surface (21) extending in a horizontal radial plane (RP) of said top ring section (11).

13. The airbag payload landing system of claim 10, further comprising a connection (15, 16) between neighboring ring sections forming said stack.

14. The airbag payload landing system of claim 3, wherein said tarpaulin (19) comprises an outer surface facing away from said central airbag section, and a friction affecting coating (20) on said outer surface.

15. The airbag payload landing system of claim 1, wherein said payload (L) has a payload axis extending at an angle relative to said upper surface (21) of said central airbag section (17), and wherein said angle forms a positive angle of attack relative to a landing direction on said landing surface (LS).

16. The airbag payload landing system of claim 15, wherein during landing said system assumes a positive angle (A) of attack relative to said landing direction on said landing surface, wherein said payload remains on said upper surface 21 of said airbag central section (17), and wherein said positive angle (A) of attack is in an angular range of 5° to 45°.

17. The airbag payload landing system of claim 1, wherein said airbag central section is cylindrical and wherein said at least one airbag ring section has a torus shape with a circular ring cross-section.

18. The airbag payload landing system of claim 10, wherein said stabilizing device has a downwardly facing surface area that provides an air resistance during landing.

* * * * *